(12) United States Patent
Chen et al.

(10) Patent No.: US 12,211,007 B2
(45) Date of Patent: Jan. 28, 2025

(54) METHOD AND DEVICE FOR INTERACTING MEETING MINUTE, APPARATUS AND MEDIUM

(71) Applicant: BEIJING ZITIAO NETWORK TECHNOLOGY CO., LTD., Beijing (CN)

(72) Inventors: Kojung Chen, Beijing (CN); Jingsheng Yang, Beijing (CN); Xiang Zheng, Beijing (CN); Chunsai Du, Beijing (CN); Xinyun Geng, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 314 days.

(21) Appl. No.: 17/692,008

(22) Filed: Mar. 10, 2022

(65) Prior Publication Data

US 2022/0198403 A1    Jun. 23, 2022

Related U.S. Application Data

(63) Continuation of application No. PCT/CN2021/130620, filed on Nov. 15, 2021.

(30) Foreign Application Priority Data

Nov. 18, 2020  (CN) .......................... 202011296610.2

(51) Int. Cl.
*G06Q 10/1093*  (2023.01)
*G10L 15/26*  (2006.01)
*H04L 12/18*  (2006.01)

(52) U.S. Cl.
CPC .......... *G06Q 10/1095* (2013.01); *G10L 15/26* (2013.01); *H04L 12/1818* (2013.01); *H04L 12/1822* (2013.01)

(58) Field of Classification Search
CPC . G06Q 10/1095; G10L 15/26; H04L 12/1818; H04L 12/1822
See application file for complete search history.

(56) References Cited

U.S. PATENT DOCUMENTS 9,311,610 B2 * 4/2016 Steincamp, II ....... G06F 3/0482
10,229,717 B1 3/2019 Davis
(Continued)

FOREIGN PATENT DOCUMENTS

CN      106875157 A    6/2017
CN      107451110 A    12/2017
(Continued)

OTHER PUBLICATIONS

International Patent Application No. PCT/CN2021/130620, International Search Report mailed Feb. 10, 2022, 10 pages.
(Continued)

*Primary Examiner* — Khaled M Kassim

(57) ABSTRACT

An interactive method and an interactive device for the meeting minute, an apparatus and a medium are provided. The method includes receiving an interactive triggering operation of a user for the meeting minute in a meeting minute display interface, where the meeting minute display interface displays a multimedia, a meeting subtitle of the multimedia and the meeting minute; and playing the multimedia based on an associated time period of the meeting minute, and distinctively displaying an associated subtitle of the meeting minute in the meeting subtitle. According to the above technical solution, the multimedia can be associated with content related to the meeting subtitle through the interactive triggering operation of the user for the meeting minute in the meeting minute display interface, to improve interactive experience effect of the user.

29 Claims, 3 Drawing Sheets

(56) References Cited

U.S. PATENT DOCUMENTS

| | | | |
|---|---|---|---|
| 11,627,006 B1* | 4/2023 | Chew | H04L 51/02 704/275 |
| 2006/0100877 A1* | 5/2006 | Zhang | G10L 15/26 704/E15.045 |
| 2006/0106872 A1* | 5/2006 | Leban | H04L 67/1095 |
| 2006/0294453 A1* | 12/2006 | Hirata | G10L 15/26 704/E15.045 |
| 2008/0133600 A1* | 6/2008 | Uehori | G06Q 10/10 |
| 2008/0177611 A1* | 7/2008 | Sommers | G06Q 10/1095 705/7.19 |
| 2011/0072362 A1* | 3/2011 | Denner | G06Q 10/109 715/751 |
| 2012/0050296 A1* | 3/2012 | Kurosawa | H04L 12/1831 345/467 |
| 2012/0219140 A1* | 8/2012 | Iga | G06Q 10/00 379/202.01 |
| 2014/0136627 A1* | 5/2014 | Epstein | G06Q 10/1095 709/205 |
| 2014/0164510 A1* | 6/2014 | Abuelsaad | G06Q 10/109 709/204 |
| 2014/0200944 A1* | 7/2014 | Henriksen | G06Q 10/1095 705/7.19 |
| 2015/0288913 A1* | 10/2015 | Maruyama | H04N 21/42204 348/445 |
| 2016/0028895 A1* | 1/2016 | Bell | H04L 12/1822 455/416 |
| 2016/0124593 A1* | 5/2016 | Joi | G06Q 10/06312 715/753 |
| 2016/0379169 A1* | 12/2016 | Chiyo | G06Q 10/00 704/235 |
| 2017/0223069 A1* | 8/2017 | Arora | G06F 3/04817 |
| 2018/0101823 A1* | 4/2018 | Nelson | G06Q 10/10 |
| 2019/0050812 A1* | 2/2019 | Boileau | G06F 3/0484 |
| 2019/0130355 A1* | 5/2019 | Gupta | G10L 15/26 |
| 2020/0194003 A1* | 6/2020 | Funato | G10L 17/00 |
| 2020/0272693 A1* | 8/2020 | Mody | G06F 16/345 |
| 2020/0359104 A1 | 11/2020 | Luo et al. | |
| 2022/0157301 A1* | 5/2022 | O'Connor | H04L 12/1831 |

FOREIGN PATENT DOCUMENTS

| | | |
|---|---|---|
| CN | 107733666 A | 2/2018 |
| CN | 108259971 A | 7/2018 |
| CN | 108600773 A | 9/2018 |
| CN | 109246472 A | 1/2019 |
| CN | 110298252 A | 10/2019 |
| CN | 110335612 A | 10/2019 |
| CN | 110365933 A | 10/2019 |
| CN | 110505201 A | 11/2019 |
| CN | 111258521 A | 6/2020 |
| CN | 111541859 A | 8/2020 |
| CN | 111723205 A | 9/2020 |
| CN | 111787267 A | 10/2020 |
| CN | 111883123 A | 11/2020 |
| CN | 113010704 A | 6/2021 |
| JP | 2005027092 A | 1/2005 |
| JP | 2006268800 A | 10/2006 |
| JP | 2011209731 A | 10/2011 |
| JP | 2014073092 A | 4/2014 |
| JP | 2015061194 A | 3/2015 |
| JP | 2016062196 A | 4/2016 |
| JP | 2018063699 A | 4/2018 |
| JP | 2019061594 A | 4/2019 |
| JP | 2019105740 A | 6/2019 |
| WO | 01/40893 A2 | 6/2001 |
| WO | 2005027092 A1 | 3/2005 |

OTHER PUBLICATIONS

Wang Xin (2019) "Design and Implementation of Intelligent Meeting Minutes System" Xidian University, a thesis.

Merialdo et al. (2011) "Static and Dynamic Video Summaries" MM'Nov. 28-Dec. 1, 2011, Scottsdale, Arizona.

Notice of Reasons for Refusal issued in JP App. No. 2023-511564 on Mar. 19, 2024, English Translation (8 pages).

Suzuki et al., Realization of a video search system for Diet deliberations using voice recognition technology, Information Processing Society of Japan, vol. 2014-SLP-103 No.6, Oct. 24, 2014 (8 pages).

* cited by examiner

METHOD AND DEVICE FOR INTERACTING MEETING MINUTE, APPARATUS AND MEDIUM

This application is a continuation of International Application No. PCT/CN2021/130620, filed on Nov. 15, 2021, which claims the priority to Chinese Patent Application No. 202011296610.2 titled "METHOD AND DEVICE FOR INTERACTING MEETING MINUTE, APPARATUS AND MEDIUM", filed on Nov. 18, 2020 with the China National Intellectual Property Administration, both of which are incorporated herein by reference in their entireties.

FIELD

The present disclosure relates to the technical field of meeting recognition, and in particular to an interactive method and an interactive device for a meeting minute, an apparatus and a medium.

BACKGROUND

With the continuous development of intelligent devices and multimedia technology, online meetings through the intelligent devices are increasingly used in daily and office life, because of outstanding performance in communication efficiency and information retention.

In some related products, a process of online meeting may be recorded to generate a multimedia file for reviewing meeting content after the meeting. However, in some scenes of the meeting with a long time period, it may take more times to review the meeting content by playing back the multimedia file. Therefore, acquisition of important information of the meeting from the multimedia has a low efficiency.

SUMMARY

An interactive method and an interactive device for a meeting minute, an apparatus and a medium are provided according to the present disclosure, to solve all or at least a part of the above technical problems.

An interactive method for a meeting minute is provided according to an embodiment of the present disclosure. The method includes:
  receiving an interactive triggering operation of a user for a meeting minute in a meeting minute display interface, where the meeting minute display interface displays a meeting audio and video, meeting subtitles of the meeting audio and video, and the meeting minute; and
  playing the meeting audio and video based on an associated time period of the meeting minute, and distinctively displaying an associated subtitle of the meeting minute in the meeting subtitles.

An interactive device for a meeting minute is further provided according to an embodiment of the present disclosure. The device includes:
  a meeting minute triggering module configured to receive an interactive triggering operation of a user for the meeting minute in a meeting minute display interface, where the meeting minute display interface displays a meeting audio and video, a meeting subtitle of the meeting audio and video, and the meeting minute; and
  an association interaction module configured to play the meeting audio and video based on an associated time period of the meeting minute, and distinctively display an associated subtitle of the meeting minute in the meeting subtitle.

An electronic apparatus is further provided according to an embodiment of the present disclosure. The electronic apparatus includes a processor and a memory. The memory is configured to store executable instructions of the processor. The processor is configured to read the executable instructions from the memory and execute the instructions to perform the interactive method for a meeting minute according to the embodiments of the present disclosure.

A computer-readable storage medium is further provided according to an embodiment of the present disclosure. The storage medium stores a computer program, and the computer program is used to perform the interactive method for a meeting minute according to the embodiments of the present disclosure.

Compared with the conventional technology, the technical solution according to the embodiment of the present disclosure has the following advantages. In the interactive method for a meeting minute according to the embodiments of the present disclosure, an interactive triggering operation of a user for a meeting minute in a meeting minute display interface is received. The meeting minute display interface displays meeting audio and video, a meeting subtitle of the meeting audio and video, and the meeting minute. The meeting audio and video are played based on an associated time period of the meeting minute, and an associated subtitle of the meeting minute in the meeting subtitle is distinctively displayed. According to the above technical solution, the meeting audio and video can be associated and interact with related content in the meeting subtitle through the interactive triggering of the user for the meeting minute in the meeting minute display interface, to improve interactive experience effect of the user. In addition, the meeting minute, the meeting audio and video and the meeting subtitles are associated with each other, such that the user can intuitively understand a relationship among the meeting minute, the meeting audio and video and the meeting subtitle, thereby helping the user to accurately understand the meeting content.

BRIEF DESCRIPTION OF THE DINITIALINGS

The above and other features, advantages and aspects of embodiments of the present disclosure become clearer in conjunction with drawings and with reference to the following embodiments. Throughout all the drawings, the same or similar reference numerals indicate the same or similar elements. It should be understood that the drawings are schematic and that the component and elements are not necessarily drawn to scale.

DETAILED DESCRIPTION OF EMBODIMENTS

Figure 1:
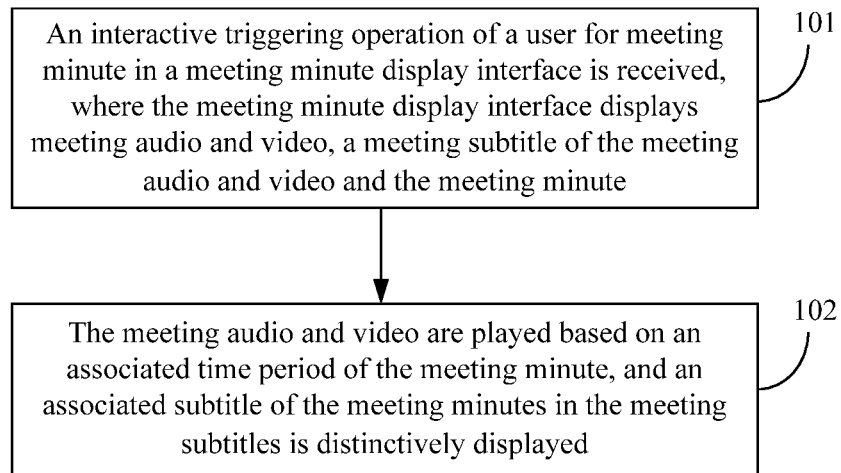
FIG. 1 is a flow chart of an interactive method for a meeting minute according to an embodiment of the present disclosure.

Embodiments of the present disclosure are described in detail below with reference to the drawings. Although some embodiments of the present disclosure are shown in the drawings, it should be understood that the present disclosure may be implemented in various forms and should not be limited to the embodiments set forth herein. In addition, the embodiments are provided for more thoroughly and completely understanding the present disclosure. It should be understood that the drawings and embodiments of the present disclosure are merely exemplary, rather than to limit the protection scope of the present disclosure.

It should be understood that steps recorded in embodiments of the method of the present disclosure may be performed in different order and/or simultaneously. Further, the embodiments of the method may include additional steps and/or steps performed not shown. The scope of the present disclosure is not limited herein.

The term "including" and variants thereof in the present disclosure are openness including, that is, "including but not limited to". The term "based on" is "based at least in part on". The term "one embodiment" indicates "at least one embodiment". The term "another embodiment" indicates "at least one other embodiment". The term "some embodiments" indicates "at least some embodiments". Relevant definitions of other terms are given in the following description.

It should be noted that concepts of "first" and "second" described in the present disclosure are only used to distinguish different devices, modules or units, and are not used to limit the order or interdependence of functions performed by the devices, modules or units.

It should be noted that modifications of "one" and "multiple" described in the present disclosure are schematic rather than restrictive, and those skilled in the art should understand the "one" and "multiple" as "one or more" unless otherwise clearly indicated in the context.

Names of messages or information exchanged among multiple devices in the embodiments of the present disclosure are only for illustration, rather than to limit the scope of the messages or information.

FIG. 1 is a flow chart of an interactive method for a meeting minute according to an embodiment of the present disclosure. The method may be performed by an interactive device for a meeting minute. The device may be implemented in software and/or hardware and may normally be integrated in an electronic apparatus. As shown in FIG. 1, the method includes the following steps 101 and 102.

In step 101, an interactive triggering operation of a user for a meeting minute in a meeting minute display interface is received. The meeting minute display interface displays a meeting audio and video, a meeting subtitle of the meeting audio and video, and the meeting minute.

The meeting minute display interface is an interface used to display pre-generated meeting minute. The meeting minute display interface may set some display areas, such as an audio or video area, a subtitle area, a meeting minute display area, to display contents related to meeting, such as the meeting audio and video, the meeting subtitle of the meeting audio and video, and the meeting minute. The interactive triggering operation is an operation for triggering the meeting minute. The triggering manner will not be limited herein.

For example, the interactive triggering operation may be a click and/or mouse-over operation on the meeting minute.

The meeting minute in the embodiments of the present disclosure is main meeting contents generated by processing the meeting audio and video. There are various types of the meeting minute. In an embodiment of the present disclosure, the meeting minute may include at least one type of a topic, an agenda, discussion, conclusion and a to-do task. Each type may include multiple meeting minute, and the number of the meeting minute will not be limited. The meeting audio and video are an audio and/or video recording the meeting. The meeting audio and video may include a meeting audio and/or a meeting video, which is not limited herein. The meeting subtitle is a text content acquired by recognizing and processing a speech in the meeting audio and video.

In the embodiment of the present disclosure, the interactive method for the meeting minute may further include: performing a speech recognition on the meeting audio and video to determine the meeting subtitle of the meeting audio and video; and performing a text processing on the meeting subtitle to generate the meeting minute. After the meeting, the meeting audio and video recording a meeting process may be acquired. Automatic speech recognition (ASR) technology is used to recognize the speech in the meeting audio and video, to converted speech information into the text. In this way, the meeting subtitle of the meeting audio and video is acquired. The speech recognition technology is not limited in the embodiment of the present disclosure. For example, a random model method or an artificial neural network method may be used. The meeting subtitle may be processed based on a preset meeting minute generation rule, to generate the meeting minute. Since there may be various types of meeting minutes, the meeting minute generation rule may be determined according to a type of meeting minute to generate different types of meeting minutes.

The meeting minute may be generated by a client device or a server, which is not limited. After the meeting minute is generated, the client device may acquire the meeting minute and display the meeting audio and video, the meeting subtitle of the meeting audio and video, and the meeting minute in the meeting minute display interface.

In an embodiment of the present disclosure, when the user browses the content in the meeting minute display interface, the client device may receive an interactive triggering operation of the user for one of the meeting minutes.

Figure 2:
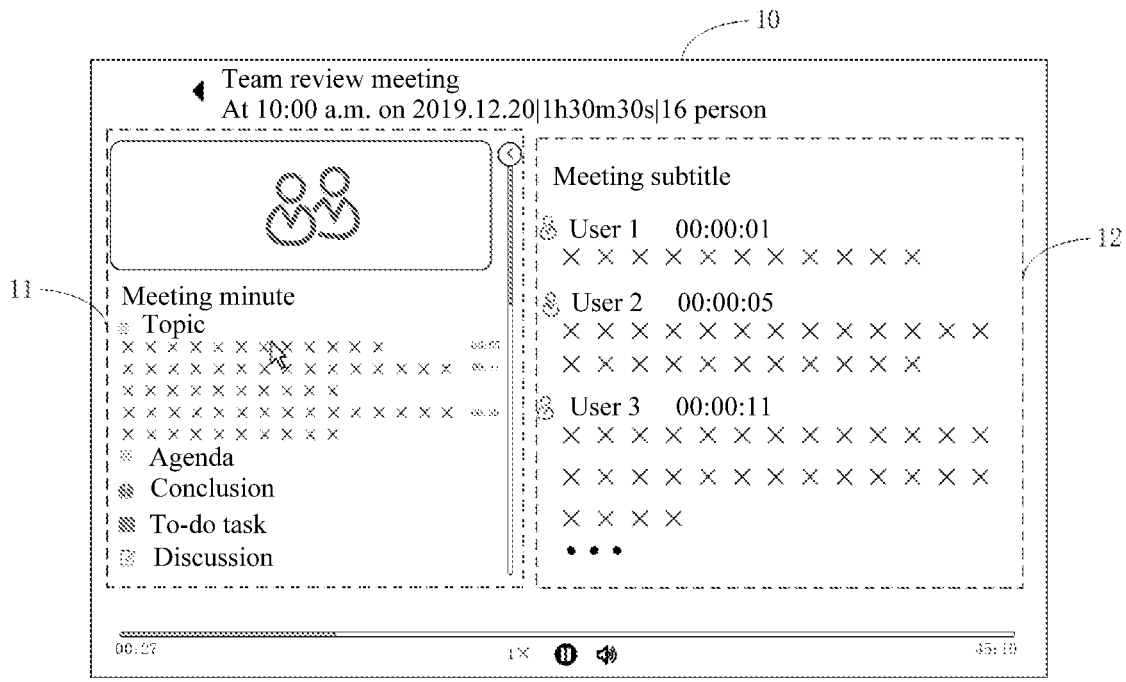
FIG. 2 is a schematic diagram of a meeting minute display interface according to an embodiment of the present disclosure.

For example, FIG. 2 is a schematic diagram of a meeting minute display interface according to an embodiment of the present disclosure. As shown in FIG. 2, a first area 11 in a meeting minute display interface 10 includes a first area 11 for displaying the meeting minute, a top of which displays a meeting video; and a second area 12 for displaying a meeting subtitle. A bottom of the meeting minute display interface 10 displays a meeting audio. In an embodiment, a timeline of the meeting audio is displayed. FIG. 2 shows five types of meeting minutes, which are a topic, an agenda, discussion, conclusion and a to-do task. The topic includes three meeting minutes. An arrow in FIG. 2 may represent an interactive triggering operation for a first meeting minute.

The meeting subtitle in FIG. 2 may be divided into subtitle segments based on different users participating in the meeting. FIG. 2 shows subtitle segments for three users, i.e., a user 1, a user 2 and a user 3. In FIG. 2, a title "team review meeting" of the meeting and contents related to meeting are further displayed on the top of the meeting minute display interface 10. In FIG. 2, "10:00 a.m. on 2019.12.30" indicates a starting time instant of the meeting, "1h30m30s" indicates that the duration of the meeting is 1 hour, 30 minutes and 20 seconds, and "16" indicates the number of participants. It can be understood that the meeting minute display interface 10 in FIG. 2 is only for illustration, and a location of each content in the meeting minute display interface 10 is only for illustration. The location and the presentation may be determined according to the actual situation.

In step 102, the meeting audio and video are played based on an associated time period of the meeting minute, and an associated subtitle of the meeting minute in the meeting subtitle is distinctively displayed.

Since the meeting minute is acquired by processing the meeting subtitle and the meeting subtitle is acquired by recognizing the speech in the meeting audio and video, the associated subtitle of the meeting minute is an subtitle corresponding to the meeting minute, and the associated time period of the meeting minute is a time period of an original meeting speech corresponding to the associated subtitle in the meeting audio and video. The associated time period may include a starting time instant and an ending time instant.

In an embodiment of the present disclosure, the interactive method for the meeting minute may further include: establishing a correspondence among the meeting minute, the associated subtitle in the meeting subtitle and the associated time period of the associated subtitles in the meeting audio and video. The meeting minute is generated based on the associated subtitle. The associated time period is used to characterize a time period of speech information corresponding to the associated subtitle in the meeting audio and video. After the meeting minute are generated, the correspondence among each meeting minute, the associated subtitle corresponding to the meeting minute in the meeting subtitle and the associated time period of the associated subtitle in the meeting audio and video may be established and stored for subsequent use.

In an embodiment, the interactive method for the meeting minute may further include: determining the associated time period of the meeting minute and the associated subtitle of the meeting minute based on the correspondence. After the interactive triggering operation of the user for the meeting minute is received, the correspondence may be found to determine the associated time period and the associated subtitle corresponding to the current meeting minute.

The process of playing the meeting audio and video based on an associated time period of the meeting minute, and distinctively displaying the associated subtitle of the meeting minute in the meeting subtitle may include: playing the meeting audio and video at the starting time instant in the associated time period of the meeting minute, and stopping the meeting audio and video at the ending time instant in the associated time period of the meeting minute; jumping the meeting subtitle to a location of the associated subtitle of the meeting minute, and distinctively displaying the associated subtitle of the meeting minute in a predetermined way. The predetermined way may be any feasible presentation that can distinguish the associated subtitle from other parts of the meeting subtitle. For example, the predetermined way may include, but be not limited to, at least one of highlighting, bold font and adding an underline.

After determining the associated time period and associated subtitle corresponding to the current meeting minute, the meeting audio and video may be played at the starting time instant and stopped at the ending time instant in the associated time period. The meeting subtitle is jumped to the location of the associated subtitle, and the associated subtitle is distinctively displayed. The way of the distinctively displaying is not limited in the embodiment of the present disclosure. For example, the predetermined way may include may include highlighting, bold font and adding an underline.

In the interactive method for the meeting minute according to an embodiment of the present disclosure, an interactive triggering operation of a user for a meeting minute in a meeting minute display interface is received. The meeting minute display interface displays a meeting audio and video, a meeting subtitle of the meeting audio and video and the meeting minute. The meeting audio and video are played based on an associated time period of the meeting minute, and an associated subtitle of the meeting minute in the meeting subtitle is distinctively displayed. According to the above technical solution, the meeting audio and video can be associated with related content in the meeting subtitle through the interactive triggering operation of the user for the meeting minute in the meeting minute display interface, to improve interactive experience effect of the user. In addition, the meeting minute, the meeting audio and video, and the meeting subtitle are associated with each other, such that the user can intuitively understand a relationship among the meeting minute, the meeting audio and video and the meeting subtitle, thereby helping the user to accurately understand the meeting content.

In some embodiments, the interactive method for the meeting minute according to an embodiment of the present disclosure further includes: associating the meeting minute in the meeting minute display interface, and displaying an associated time point corresponding to the meeting minute. The associated time point may be determined based on the associated time period of the meeting minute. For example, the associated time point may be the starting time instant in the associated time period of the meeting minute. In an embodiment, when displaying the meeting minute, the meeting minute display interface is associated with the meeting minute and displays the associated time point corresponding to the meeting minute. In an embodiment, the associated time point may further include the ending time instant in the associated time period of the meeting minute. That is, the meeting minute display interface may be associated with the meeting minute, and display the starting time instant and the ending time instant of the associated time period.

For example, as shown in FIG. 2, three meeting minute under the topic respectively show associated time points, "00:05", "00:11" and "00:39". The display of the above associated time points is helpful for users to understand associated locations of the meeting minutes in the meeting audio and video.

In some embodiments, the interactive method for the meeting minute according to an embodiment of the present disclosure may further include: receiving a first deletion triggering operation of the user, and deleting a first to-be-deleted meeting minute and an associated time point of the first to-be-deleted meeting minute. In an embodiment, the interactive method for the meeting minute further includes: receiving a second deletion triggering operation of the user, deleting a second to-be-deleted meeting minute, and adding a new meeting minute based on an associated time point of the second to-be-deleted meeting minute.

Both the first deletion triggering operation and the second deletion triggering operation represent a triggering operation for deleting the meeting minute. A difference is that two deletion triggering operations are direct at different objects. The first deletion triggering operation is direct at the meeting minute and the associated time point of the meeting minute. The second deletion triggering operation is only direct at the meeting minute. After the first deletion triggering operation of the user is received, the first to-be-deleted meeting minute corresponding to the first deletion triggering operation and the associated time point of the first to-be-deleted meeting minute may be deleted. After the second deletion triggering operation of the user is received, the second to-be-deleted meeting minute corresponding to the second deletion triggering operation may be deleted, and a new meeting minute may be edited and added based on the associated time point of the reserved second to-be-deleted meeting minute, to replace the second to-be-deleted meeting minute.

In some embodiments, the interactive method for the meeting minute according to an embodiment of the present disclosure may further include: receiving a modification triggering operation of the user for a to-be-modified meeting minute; and modifying the to-be-modified meeting minute and/or an associated time point of the to-be-modified meeting minute. The modification triggering operation may be understood as a triggering operation for modifying the meeting minute, and the way of the triggering operation will not be limited. The to-be-modified meeting minute is any one of multiple meeting minutes. After the modification triggering operation of the user for the to-be-modified meeting minute is received, the to-be-modified meeting minute may be modified, and/or the associated time point of the to-be-modified meeting minute may be modified.

In an embodiment of the present disclosure, the user can delete and modify the meeting minute according to the actual situation. Deleted and modified contents are more flexible. Compared with the conventional solution, the solution according to the present disclosure can meet the actual requirements of the user. The accuracy of the meeting minute is improved through deletion and modification, thereby improving the experience effect of the user.

In some embodiments, the interactive method for the meeting minute according to an embodiment of the present disclosure may further include: receiving a minute addition triggering operation of the user for a target subtitle in the meeting subtitle; displaying a minute addition interface, where the minute addition interface includes at least one minute addition component, and one minute addition component corresponds to one type of meeting minute; and receiving a triggering operation of the user for the minute addition component, and adding the target subtitle as a target meeting minute of a type corresponding to the minute addition component. In an embodiment, the interactive method for the meeting minute may further include: determining a starting time instant in an association time period of the target subtitle as a target association time point of the target meeting minute, and associating and displaying the target association time point and the target meeting minute.

The minute addition triggering operation refers to a triggering operation for adding the meeting minute, which is used for the meeting subtitle. The way of the minute addition triggering operation will not be limited in the embodiment of the present disclosure, which may for example include clicking or suspending a subtitle. After a minute addition triggering operation of the user for the target subtitle is received, the minute addition interface may be displayed. The minute addition interface may display multiple minute addition components. The minute addition component is used to add the meeting minute. Each minute addition component corresponds to one type of meeting minute. When the user triggering one of the minute addition components is received, the target subtitle may be added as the target meeting minute of a type corresponding to the minute addition component. Further, a starting time instant of an associated time period of the target subtitle may be determined as an associated time point of the target meeting minute, that is, a target associated time point. The meeting minute display interface displays the added target meeting minute and the target associated time point.

Figure 3:
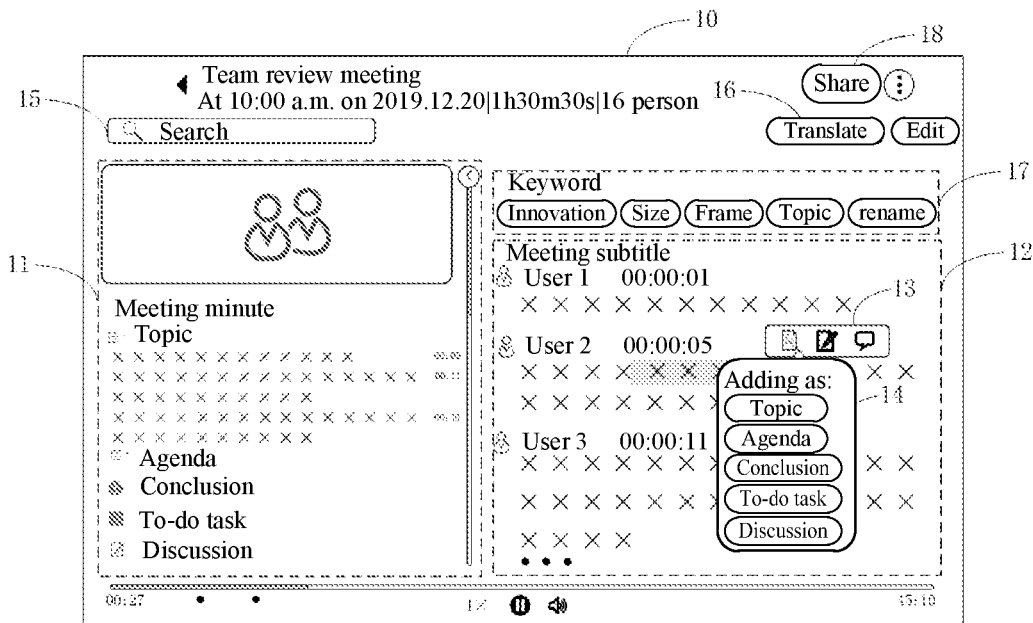
FIG. 3 is a schematic diagram of a meeting minute display interface according to another embodiment of the present disclosure.

For example, FIG. 3 is a schematic diagram of a meeting minute display interface according to another embodiment of the present disclosure. As shown in FIG. 3, the second area 12 in the meeting minute display interface 10 displays the meeting subtitle. A part of subtitle of a user 2 in the meeting subtitle is triggered, and a target subtitle corresponding to the minute addition triggering operation is a subtitle for adding a background color. After the target subtitle is triggered, a minute addition interface 14 may be displayed as shown in FIG. 3. The minute addition interface 14 displays multiple minute addition components. FIG. 3 shows five minute addition components, which are a topic component, an agenda component, a discussion component, a conclusion component and a to-do task component.

In an embodiment, after the target subtitle is triggered, as shown in FIG. 3, a display box 13 of operable buttons may further be displayed. The display box 13 displays a minute button, an edit button and a comment button from left to right. The user may trigger any one of the operable buttons to achieve an operation for the target subtitle. For example, after triggering the comment button, the user may comment on the target subtitle. The minute button is one of the operable buttons. After the user triggers the minute button, a bottom of the display box 13 may display the minute addition interface 14. As shown in FIG. 3, a gesture cursor may indicate a triggering operation for the minute button by the user. For example, after the user triggers the agenda component, the target subtitle in FIG. 3 is added as the target meeting minute with the type of agenda. The target meeting minute, as well as the associated time point of the target meeting minute, is displayed at a bottom of the agenda in the first area 11.

In an embodiment of the present disclosure, the user can add the meeting minute based on the meeting subtitle. The addition way is flexible. When automatically generated meeting minute is inaccurate, the new meeting minute may be added manually, improving the accuracy of the meeting minute.

In some embodiments, the interactive method for the meeting minute according to an embodiment of the present disclosure may further include: receiving a meeting minute display operation of an authorized user, where the authorized user is a user having an editing permission; and displaying a to-be-released meeting minute set for the meeting audio and video, based on historical meeting minute display data of the authorized user. One authorized user corresponds to one to-be-released meeting minute set. The to-be-released meeting minute set includes at least one to-be-released meeting minute.

It should be understood that the authorized user can edit, modify and/or delete at least a part of the meeting minute. The number of the authorized user may be multiple, which will not be limited herein. The meeting minute display operation is an operation for displaying the automatically generated meeting minute. The historical meeting minute display data is meeting minute display data of different meeting audios or videos that are displayed to the authorized user within a set historical time period, that is, historical data of a to-be-released meeting minute set of different meeting audios or videos for a current authorized user. The preset historical time period may be set according to the actual situation. For example, the set historical time period may be a previous day or a previous week. The to-be-released meeting minute is not released, which is only for the authorized user to browse and cannot be seen by other users.

In an embodiment of the present disclosure, when the meeting minute display operation of the authorized user is received, the historical meeting minute display data of the authorized user may be acquired. The to-be-released meeting minute automatically generated from the meeting audio and video may be processed according to the historical meeting minute display data, to acquire a to-be-released meeting minute set corresponding to the current authorized user and display the to-be-released meeting minute set. Different authorized users correspond to different to-be-released meeting minute sets.

For example, for an authorized user A, the to-be-released meeting minute set of the current meeting audio and video includes to-be-released meeting minutes 1, 2 and 3. For an authorized user B, the to-be-released meeting minute set of the current meeting audio and video includes to-be-released meeting minutes 3, 4 and 5. The authorized user A and the authorized user B have only one same to-be-released meeting minute 3, and other to-be-released meeting minutes are different.

In an embodiment of the present disclosure, a personalized display is performed on the automatically generated meeting minute for different authorized users according to historical data of the authorized users, so that the displayed meeting minutes are more in line with editing habits or user portraits of the authorized users, improving flexibility of display of the meeting minute.

In some embodiments, the interactive method for the meeting minute according to an embodiment of the present disclosure may further include: receiving a release triggering operation for a target to-be-released meeting minute from a target authorized user; and releasing the target to-be-released meeting minute, to cause other authorized users and a non-authorized user to browse a release search hit prompt identifier meeting minute. The non-authorized user has no editing permission.

The non-authorized user is different from the authorized user. The non-authorized user may only browse the meeting minute and have no permission to edit the meeting minute. The release triggering operation is a triggering operation for releasing the to-be-released meeting minute. After the release triggering operation for the target to-be-released meeting minute is received from the target authorized user, the target to-be-released meeting minute may be released. The other authorized user and a non-authorized user may browse the released meeting minute in the meeting minute display interface. Moreover, the released meeting minute cannot be released by the other authorized user again, and the released meeting minute can be deleted, modified and added by the other authorized user. In the embodiment of the present disclosure, the authorized user releases the meeting minute, such that all users can browse the edited meeting minute.

In some embodiments, the interactive method for the meeting minute according to an embodiment of the present disclosure may further include: receiving a search triggering operation of the user for a search keyword; and distinctively displaying a target keyword hit by searching for the search keyword in the meeting subtitle and/or the meeting minute. In an embodiment, the interactive method for the meeting minute may further include: displaying a search hit prompt identifier at a location corresponding to a time point of the target keyword on a playback timeline of the meeting audio and video.

The search keyword may be a to-be-searched keyword currently input by the user. The search triggering operation is a triggering operation for searching, which will not be limited herein. For example, a preset search button may be triggered. The target keyword has a same or similar keyword as the search keyword. After the search triggering operation of the user for the search keyword is receiving, a search operation may be performed on the meeting subtitle and/or the meeting minute, a word having a matching degree greater than a matching degree threshold is determined as the target keyword hit by searching. The target keyword is distinctively displayed in a preset way. The preset way is not limited in the embodiment of the present disclosure, for example, the preset way may be at least one of highlighting, bold font and adding an underline.

After the target keyword is determined, a time point of the target keyword in the meeting audio and video may further be determined. The search hit prompt identifier is displayed at the location corresponding to the time point of the target keyword on the playback timeline of the meeting audio and video. The search hit prompt identifier is used to prompt the user that a subtitle corresponding to a current location is hit by searching. The form of the search hit prompt identifier is not limited, for example, a dot may be used to represent the search hit prompt identifier.

For example, as shown in FIG. 3, a search area 15 is display at a top of the first area 11 in the meeting minute display interface 10. The user may input the search keyword in the search area 15 and trigger the search button, so that the search operation for the search keyword is performed. After the search is completed, the hit target keyword in the meeting subtitle and/or the meeting minute is distinctively displayed. A dot below the playback timeline of the meeting audio at the bottom of the meeting minute display interface 10 indicates the search hit prompt identifier.

In an embodiment of the present disclosure, the meeting minute and/or the meeting subtitle can support a search function. The keyword after the search may be associated with the meeting minute, the meeting subtitle and the meeting audio and video, so that the user can intuitively and quickly understand a correspondence between the search result and different contents, improving the search experience effect of the user.

In some embodiments, the interactive method for the meeting minute according to an embodiment of the present disclosure may further include: receiving a translation triggering operation of the user for the meeting subtitle and/or the meeting minute; and translating the meeting subtitle and/or the meeting minute from an initial language to a target language.

The translation triggering operation is a triggering operation for translating the meeting subtitle and/or the meeting minute between different languages. After the translation triggering operation of the user for the meeting subtitle and/or the meeting minute is received, the meeting subtitle and/or the meeting minute may be translated from a current initial language to the target language. The target language may be a translation language specified by the user. There may be various types of target languages, which will not be limited herein.

For example, as shown in FIG. 3, the meeting minute display interface 10 displays a translation button 16. When the user triggers the translation button 16, all texts in the meeting minute display interface 10 may be translated, or a targeted translation is performed on the meeting subtitle or the meeting minute, from the initial language to the target language. For example, the meeting subtitle and the meeting minute may be translated from Chinese to English.

In the embodiment of the present disclosure, the meeting minute and/or the meeting subtitle can support the translation function, and can meet translation requirements of users for different languages, which is more conducive for users to understand the contents of the meeting minute and/or the meeting subtitle.

In some embodiments, the meeting minute and the meeting video in the meeting audio and video are displayed in the same display window, and the meeting video is displayed in a top area of the display window. For example, as shown in FIG. 2, in the meeting minute display interface 10, the meeting minute and the meeting video are displayed in the first area 11, the first area 11 is the display window 11, and the meeting video is displayed in the top area of the display window 11.

In some embodiments, the interactive method for the meeting minute according to an embodiment of the present disclosure may further include: receiving a scrolling operation of the user for the display window, and displaying in a scrolling manner the meeting video and the meeting minute in the display window. The number of the meeting minute may be multiple. If the number of the meeting minute is too large and some meeting minutes are hidden. Thus, the scrolling operation of the user for the display window may be received, and the hidden meeting minutes may be displayed by scrolling the display window.

Figure 4:
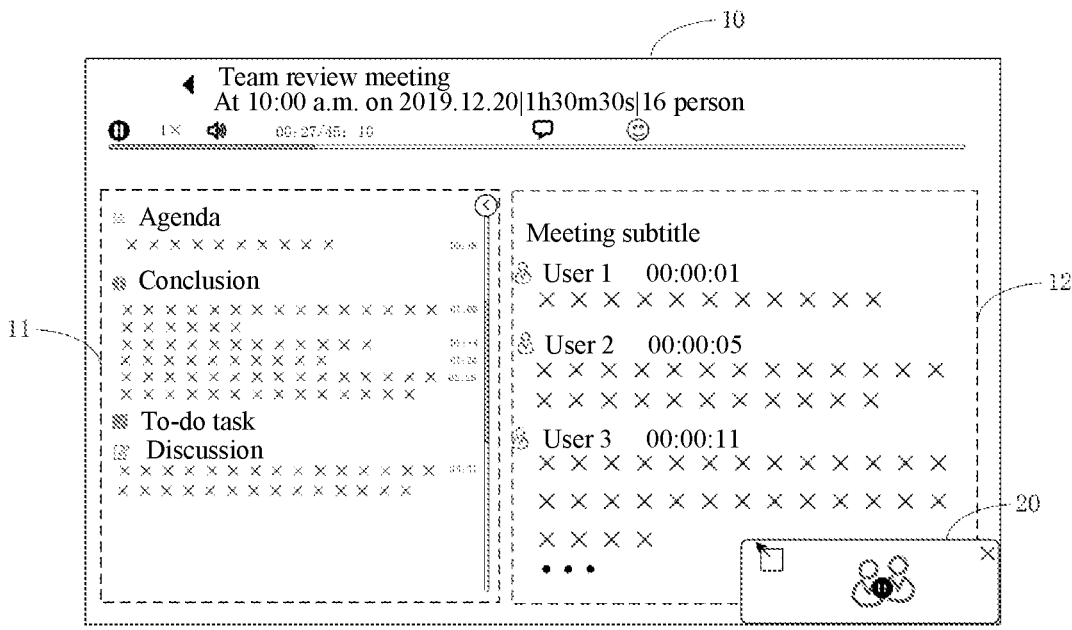
FIG. 4 is a schematic diagram of a meeting minute display interface according to another embodiment of the present disclosure.

For example, as shown in FIG. 3, the display window 11 in the meeting minute display interface 10 may display multiple meeting minutes. When the user wants to browse the hidden meeting minutes, the user may scroll in the display window 11, to display more meeting minutes. For example, FIG. 4 is a schematic diagram of a meeting minute display interface according to another embodiment of the present disclosure. The scrolled display window 11 in FIG. 4 shows the hidden meeting minutes, and the meeting video is moved out of the display window. A right side of the display window 11 is further provided with a scroll bar and a slide block. The scrolling operation of the display window 11 may be triggered by dragging the slide block down. Different locations of the slide block in FIG. 3 and FIG. 4 may indicate that the display window 11 is scrolled. Alternatively, the scrolling operation may further be triggered by scrolling a mouse wheel directly in the display window 11.

In the above solution, the display window for displaying the meeting minute and the meeting video may be displayed in the scrolling manner according to the actual requirements of the user, so that more hidden meeting minutes can be displayed. In this way, the user can browse more meeting minutes, thereby improving the display effect of the meeting minutes.

In an embodiment, the interactive method for the meeting minute may further include: in a scrolling process of the display window, displaying a small video window of the meeting video in the meeting minute display interface if the meeting video is moved out of the display window. In an embodiment, the small video window and the display window may not be covered with each other.

The small video window may be a floating window. The floating window may be, for example, presented in a screen area of the meeting minute display interface. A location of the video window may be determined according to the actual situation. For example, the location of the video window may be a location that does not cover the meeting minute in the display window. In the scrolling process of the display window, since the meeting video is set at the top area of the display window, the meeting video may be moved out of the display window with the scrolling of the display window. When the meeting video is detected to be moved out of the display window, the meeting minute display interface may display the small video window of the meeting video, so that the user can continue to browse the meeting video.

For example, as shown in FIG. 4, a small video window 20 is displayed at a lower right corner of the meeting minute display interface 10. The small video window 20 does not cover the meeting minute and has little impact on the meeting subtitles.

In the above solution, when the meeting video is moved out of the display window due to the scrolling operation, that is, when the meeting video is hidden, the user can continue to browse the meeting video through the small video window, so that browsing of the meeting minute by the user is not affected, thereby improving the display effect of the meeting minute and the meeting video.

In an embodiment, the interactive method for the meeting minute may further include: receiving a triggering operation of the user for an operable control in the small video window, and performing a target operation corresponding to the operable control on the small video window. In an embodiment, the operable control includes at least one of an exit control, a pause control and a close control. The target operation corresponding to the operable control includes at least one of an exit and jump operation, a pause playback operation and a close operation.

The operable control is a preset control for performing an operation on the small video window. There are various types of the operable control. The operable control may be set according to the actual situation. The operable control in the embodiment of the present disclosure may include at least one of an exit control, a pause control, and a close control. Different operable controls correspond to different operations. After the meeting minute display interface displays the small video window, the operable controls may be displayed to the user. When the triggering operation, such as a click operation, of the user for the operable control in the video window is received, a target operation may be performed on the small video window. When the triggering operation of the user for the exit control is received, the small video window may be exited and the display window is jumped to the top area. When the triggering operation of the user for the pause control is received, the meeting video in the video window may be paused. When the triggering operation of the user for the close control is received, the small video window may be closed.

For example, as shown in FIG. 4, three operable controls is displayed in the small video window 20 in the meeting minute display interface 10, which are the exit control at an upper left corner of the small video window 20, the pause control at a middle of the small video window 20, and the close control at an upper right corner of the small video window 20. The user may trigger any one of the operable controls, to perform an operation corresponding to operable control on the small video window 20. In an embodiment, when the triggering operation of the user for the exit control is received, the small video window may be exited and the display window is jumped to the display interface that can present the meeting video.

In an embodiment of the present disclosure, after the meeting minute display interface displays the small video window of the meeting video, the user can perform various operations on the small video window through the operable controls. Thus, the user can open or close the small video window according to the actual requirements, thereby improving the interactive experience effect of the small video window.

In addition, as shown in FIG. 3, a keyword display area 17 and a share button 18 are further provided on the meeting minute display interface 10. When the user triggers one of the buttons, an operation corresponding to the button may be performed. The keyword display area 17 displays, for example, five keywords, which are "innovation", "size", "frame", "part" and "rename". The keywords may be obtained by performing keyword extraction on the meeting subtitle and the meeting minute. When the user triggers one of the keywords, the keyword in the meeting subtitle and the meeting minute may be distinctively displayed. For example, when the keyword "innovation" is triggered, "innovation" in the meeting subtitle and the meeting minute is distinctively displayed. When the user triggers the sharing button 18, the meeting minute display interface 10 may be completely shared with other users.

Referring to FIGS. 3 and 4, the meeting audio may be displayed at a bottom or a top of the meeting minute display interface 10. The location of the meeting audio will not be limited herein, which may be determined according to the actual situation. Referring to FIG. 4, a subtitle interactive prompt identifier for the meeting subtitle may further be displayed on a timeline of the meeting audio. A comment prompt identifier and an expression prompt identifier in the subtitle interactive prompt identifier are shown from left to right in FIG. 4.

It may be understood that the meeting minute display interface in FIGS. 2, 3 and 4 in the embodiments of the present disclosure is only for illustration and is not limited in the present disclosure. The meeting minute display interface may be determined according to the actual situation and the requirements of the user.

In the interactive method for the meeting minute according to the embodiments of the disclosure, the meeting audio and video can interact with relevant contents of the meeting subtitle, through the interactive triggering operation of the user for the meeting minute in the meeting minute display interface. Compared with the conventional interaction way of the meeting minute, the interactive experience effect of the user is improved by the interactive method for the meeting minute according the present disclosure. The meeting minute, the meeting audio and video, and the meeting subtitle are associated with each other, such that the user can intuitively understand a relationship between the meeting minute, the meeting audio and video and the meeting subtitle, thereby helping the user to accurately understand the meeting content. Moreover, the user can delete, modify, add, release, search, and translate the meeting minute in the embodiments of the disclosure. Thus, the interactive functions are more diverse, which is more conducive to meeting the diversified requirements of the user. If the number of the meeting minutes is too large, the hidden meeting minutes may be displayed through scrolling a window. In addition, when the meeting video is hidden, the user can continue to browse the meeting video through the small video window to be seamlessly connected, improving the browsing effect of the user for the meeting video.

Figure 5:
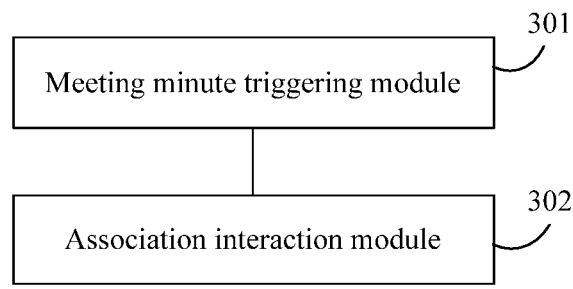
FIG. 5 is a schematic structural diagram of an interactive device for a meeting minute according to an embodiment of the present disclosure.

FIG. 5 is a schematic structural diagram of an interactive device for a meeting minute according to an embodiment of the present disclosure. The device may be implemented in software and/or hardware and may normally be integrated in an electronic apparatus. As shown in FIG. 5, the device includes a meeting minute triggering module 301 and an association interaction module 302.

The meeting minute triggering module 301 is configured to receive an interactive triggering operation of a user for the meeting minute in a meeting minute display interface. The meeting minute display interface displays a meeting audio and video, a meeting subtitle of the meeting audio and video and the meeting minute.

The association interaction module 302 is configured to play the meeting audio and video based on an associated time period of the meeting minute, and distinctively display an associated subtitle of the meeting minute in the meeting subtitle.

In an embodiment, the device further includes a meeting minute generation module.

The meeting minute generation module is configured to: perform a speech recognition on the meeting audio and video to determine the meeting subtitle of the meeting audio and video; and perform a text processing on the meeting subtitle to generate the meeting minute.

In an embodiment, the device further includes a correspondence module.

The correspondence module is configured to: establish a correspondence among the meeting minute, the associated subtitle in the meeting subtitle and the associated time period of the associated subtitle in the meeting audio and video. The meeting minute is generated based on the associated subtitle. The associated time period is used to characterize a time period of speech information corresponding to the associated subtitle in the meeting audio and video.

In an embodiment, the device further includes an association information determination module.

The association information determination module is configured to determine the associated time period of the meeting minute and the associated subtitle of the meeting minute, based on the correspondence.

In an embodiment, the association interaction module 302 is further configured to play the meeting audio and video at a starting time instant in the associated time period of the meeting minute, and stop the meeting audio and video at an ending time instant in the associated time period of the meeting minute; and jump the meeting subtitle to a location of the associated subtitle of the meeting minute, and distinctively display the associated subtitle of the meeting minute in a predetermined way.

In an embodiment, the predetermined way includes at least one of highlighting, bold font and adding an underline.

In an embodiment, the device further includes an association time point module.

The association time point module is configured to associate the meeting minute in the meeting minute display interface, and display an associated time point corresponding to the meeting minute.

In an embodiment, the associated time point is a starting time instant in the associated time period of the meeting minute.

In an embodiment, the device further includes a first deletion module.

The first deletion module is configured to receive a first deletion triggering operation of the user, and delete a first to-be-deleted meeting minute and an associated time point of the first to-be-deleted meeting minute.

In an embodiment, the device further includes a second deletion module.

The second deletion module is configured to receive a second deletion triggering operation of the user, delete a second to-be-deleted meeting minute, and add a new meeting minute based on an associated time point of the second to-be-deleted meeting minute.

In an embodiment, the device further includes a modification module.

The modification module is configured to receive a modification triggering operation of the user for a to-be-modified meeting minute; and modify the to-be-modified meeting minute and/or an associated time point of the to-be-modified meeting minute.

In an embodiment, the device further includes an adding module.

The adding module is configured to receive a minute addition triggering operation of the user for target subtitle in the meeting subtitle; display a minute addition interface, where the minute addition interface includes at least one minute addition component, and one minute addition component corresponds to one type of meeting minute; and receive a triggering operation of the user for the minute addition component, and add the target subtitle as a target meeting minute of a type corresponding to the minute addition component.

In an embodiment, the adding module is further configured to: determine a starting time instant in an association time period of the target subtitle as a target association time point of the target meeting minute, and associate and display the target association time point and the target meeting minute.

In an embodiment, the device further includes a meeting minute push module.

The meeting minute push module is configured to receive a meeting minute display operation of an authorized user, where the authorized user is a user having an editing permission; and display a to-be-released meeting minute set for the meeting audio and video, based on historical meeting minute display data of the authorized user.

In an embodiment, one authorized user corresponds to one to-be-released meeting minute set, and the to-be-released meeting minute set includes at least one to-be-released meeting minute.

In an embodiment, the device further includes a release module.

The release module is configured to receive a release triggering operation for a target to-be-released meeting minute from a target authorized user; and release the target to-be-released meeting minute, to cause other authorized users and a non-authorized user to browse a released meeting minute, where the non-authorized user has no editing permission.

In an embodiment, the device further includes a search module.

The search module is configured to receive a search triggering operation of the user for a search keyword; and distinctively display a target keyword hit by searching for the search keyword in the meeting subtitle and the meeting minute.

In an embodiment, the search module is further configured to display a search hit prompt identifier at a location corresponding to a time point of the target keyword on a playback timeline of the meeting audio and video.

In an embodiment, the device further includes a translation module.

The translation module is configured to receive a translation triggering operation of the user for the meeting subtitle and/or the meeting minute; and translate the meeting subtitle and the meeting minute from an initial language to a target language.

In an embodiment, the meeting minute and the meeting video in the meeting audio and video are displayed in a same display window. The meeting video is displayed in a top area of the display window.

In an embodiment, the device further includes a scrolling displaying module.

The scrolling displaying module is configured to receive a scrolling operation of the user for the display window; and display, in a scrolling manner, the meeting video and the meeting minute in the display window.

In an embodiment, the device further includes a small video window module.

The small video window module is configured to display, in a scrolling process of the display window, a small video window of the meeting video in the meeting minute display interface, in a case that the meeting video is moved out of the display window.

In an embodiment, the small video window and the display window are not covered with each other.

In an embodiment, the small video window module is further configured to: receive a triggering operation of the user for an operable control in the small video window, and perform a target operation corresponding to the operable control on the small video window.

In an embodiment, the operable control includes at least one of an exit control, a pause control and a close control. The target operation corresponding to the operable control includes at least one of an exit and jump operation, a pause playback operation and a close operation.

In an embodiment, the meeting minute include at least one type of a topic, an agenda, discussion, conclusion and a to-do task.

The interactive device for the meeting minute according to an embodiment of the present disclosure may perform the interactive method for the meeting minute according to any one of the embodiments of the present disclosure, and a functional module has a same beneficial effect as the method performed by the functional module.

Figure 6:
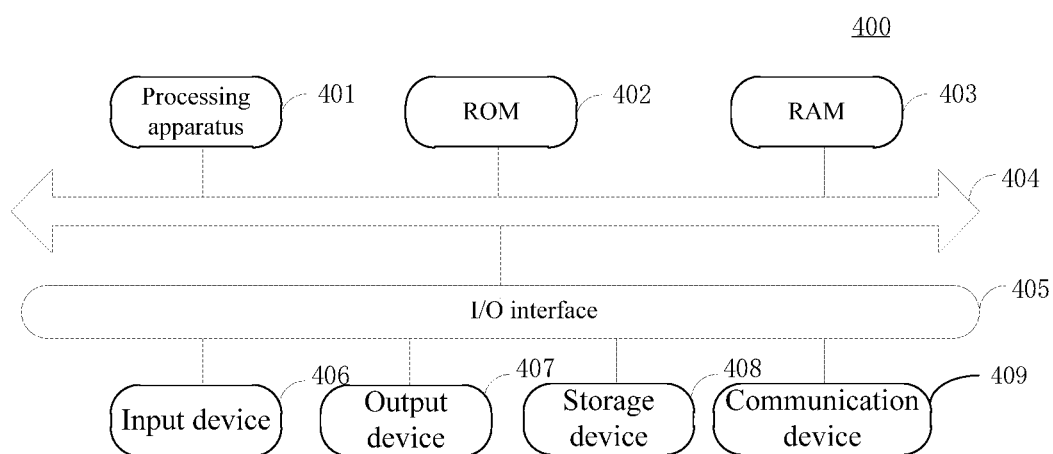
FIG. 6 is a schematic structural diagram of an electronic apparatus according to an embodiment of the present disclosure.

FIG. 6 is a schematic structural diagram of an electronic apparatus according to an embodiment of the present disclosure. Reference is made to FIG. 6, which shows a schematic structural diagram of an electronic apparatus 400 according to an embodiment of the present disclosure. The electronic apparatus according to the embodiment of the present disclosure may include, but are not limited to, a mobile terminal, such as a mobile phone, a laptop, a digital broadcast receiver, a personal digital assistant (PDA), a tablet (PAD), a portable multimedia player (PMP), a vehicle-mounted terminal (such as in-vehicle navigation terminal); and a fixed terminal, such as a digital TV and a desktop computer. The electronic apparatus shown in FIG. 6 is only exemplary, and should not indicate any limitation to the function and scope of application of the embodiments of the present disclosure.

As shown in FIG. 6, the electronic apparatus 400 may include a processing apparatus (such as a central processing unit or a graphics processor) 401, which may execute various operations and processing based on a program stored in a read-only memory (ROM) 402 or a program loaded from a storage 408 into a random-access memory (RAM) 403. The RAM 403 is further configured to store various programs and data required by the electronic apparatus 400. The processing apparatus 401, the ROM 402 and the RAM 403 are connected to each other through a bus 404. An Input/output (I/O) interface 405 is also connected to the bus 404.

Generally, the I/O interface 405 may be connected to: an input device 406, such as a touch screen, a touch panel, a keyboard, a mouse, a camera, a microphone, an accelerometer, and a gyroscope; an output device 407, such as a liquid crystal display (LCD), a speaker, and a vibrator; a storage device 408 such as a magnetic tape and a hard disk; and a communication device 409. The communication device 409 enables wireless or wired communication between the electronic apparatus 400 and other devices for data exchanging. Although FIG. 6 shows an electronic apparatus 400 having various components, it should be understood that the illustrated components are not necessarily required to all be implemented or embodied. Alternatively, more or fewer devices may be implemented or included.

Particularly, according to an embodiment of the present disclosure, the process described above in conjunction with flow charts may be implemented as a computer program. For example, a computer program product is further provided according to an embodiment of the present disclosure. The computer program product includes a computer program carried on a non-transitory computer-readable medium. The computer program includes program codes for performing the method shown in the flowchart. In the embodiment, the computer program may be downloaded and installed from the network via the communication device 409, or installed from the storage 408, or installed from the ROM 402. When the computer program is executed by the processing device 401, the functions defined in the interactive method for the meeting minute according to the embodiments of the present disclosure are performed.

It should be noted that, the computer-readable medium in the present disclosure may be a computer-readable signal medium or a computer-readable storage medium or any combination thereof. The computer-readable storage medium may include, but is not limited to, a system, an apparatus, or a device in an electronic, magnetic, optical, electromagnetic, infrared, or semi-conductive form, or any combination thereof. Concrete examples of the computer readable storage medium may include, but is not limited to, an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device or any combination thereof. In the present disclosure, the computer-readable storage medium may be any tangible medium including or storing a program, and the program may be used by or in combination with an instruction execution system, apparatus, or device. In the present disclosure, the computer-readable signal medium may be a data signal in a baseband or transmitted as a part of a carrier wave and carrying computer-readable program codes. The transmitted data signal may be in various forms, including but not limited to an electromagnetic signal, an optical signal or any proper combination thereof. The computer-readable signal medium may alternatively be any computer-readable medium other than the computer-readable storage medium. The computer-readable medium may send, propagate or transmit a program for use by or use in combination with an instruction execution system, apparatus or a component. The program codes stored in the computer-readable medium may be transmitted via any proper medium including but not limited to: a wire, an optical cable, radio frequency (RF) and the like, or any proper combination thereof.

In some embodiments, a client device and a server may communicate in any currently known or future developed network protocol such as a hypertext transfer protocol (HTTP), and may be interconnected with any form or medium of digital data communication (for example, communication network). The communication network includes, for example, a local area network (LAN), a wide area network (WAN), an Internet network (for example, the Internet), and an end-to-end network (for example, an ad hoc end-to-end network), and any currently known or future developed network.

The computer-readable medium may be included in the electronic apparatus, or may exist alone without being assembled into the electronic apparatus.

The computer-readable medium carries one or more programs. When the one or more programs are executed by the electronic apparatus, the electronic apparatus receives an interactive triggering operation of a user for a meeting minute in a meeting minute display interface, where the meeting minute display interface displays meeting audio and video, a meeting subtitle of the meeting audio and video and the meeting minute; and play the meeting audio and video based on an associated time period of the meeting minute, and distinctively displaying an associated subtitle of the meeting minute in the meeting subtitle.

The computer program codes for performing the operations disclosed in the embodiments of the present disclosure may be written in one or more programming languages or combinations thereof. The programming languages include, but are not limited to, an object-oriented programming language, such as Java, Smalltalk, and C++, and a conventional procedural programming language, such as C language or a similar programming language. The program codes may be entirely executed on a user computer, partially on the user computer, as a standalone software package, partially on the user computer and partially on a remote computer, or entirely on the remote computer or a server. In the case of involving a remote computer, the remote computer may be connected to a user computer or an external computer (for example, the remote computer may be connected through Internet connection by an Internet service provider) through any kind of network including the local area network (LAN) or the wide area network (WAN).

Flow charts and block charts in the drawings show architecture, functions and operations that can be implemented by the system, method and computer program produce according to the embodiments of the present disclosure. Each block in a flowchart or a block diagram may represent a module, a program segment, or a part of codes, and part of the module, the program segment, the part of codes includes one or more executable instructions for implementing the specified logical function. It should be noted that, in some alternative implementations, the functions marked in blocks may be performed in an order different from the order shown in the drawings. For example, two blocks shown in succession may actually be executed in parallel, or sometimes may be executed in a reverse order, which depends on the functions involved. It should be noted that each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The units mentioned in the description of the embodiments of the present disclosure may be implemented by means of software, or otherwise by means of hardware. In some circumstances, names of units do not constitute a limitation on the units themselves.

The functions described above in the present disclosure may be performed at least in part by one or more hardware logic units. For example, without limitation, exemplary types of hardware logic components that may be used include: field programmable gate array (FPGA), application specific integrated circuit (ASIC), application specific standard product (ASSP), system on chip (SOC), complex programmable logic device (CPLD) and the like.

In the present disclosure, a machine-readable medium may be a tangible medium including or storing a program that is used or in combination with an instruction execution system, device or device. The machine-readable medium may be a machine-readable signal medium or a machine-readable storage medium. The machine-readable medium may include, but is not limited to, electronic, magnetic, optical, electromagnetic, infrared, or a semiconductor system, an apparatus or a device, or any suitable combination of the above. The machine-readable storage medium includes, for example, an electrical connection with one or more wires, a portable computer disk, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device or any suitable combination thereof.

According to one or more embodiments of the present disclosure, an interactive method for a meeting minute is provided. The method includes:
  receiving an interactive triggering operation of a user for the meeting minute in a meeting minute display interface, wherein the meeting minute display interface displays meeting audio and video, a meeting subtitle of the meeting audio and video and the meeting minute; and
  playing the meeting audio and video based on an associated time period of the meeting minute, and distinctively displaying an associated subtitle of the meeting minute in the meeting subtitle.

According to one or more embodiments of the present disclosure, the interactive method for the meeting minute according to the present disclosure further includes:
  performing a speech recognition on the meeting audio and video, to determine the meeting subtitle of the meeting audio and video; and
  performing a text processing on the meeting subtitle to generate the meeting minute.

According to one or more embodiments of the present disclosure, the interactive method for the meeting minute according to the present disclosure further includes:
  establishing a correspondence among the meeting minute, the associated subtitle in the meeting subtitle and the associated time period of the associated subtitle in the meeting audio and video, where the meeting minute is generated based on the associated subtitle, and the associated time period is used to characterize a time period of speech information corresponding to the associated subtitle in the meeting audio and video.

According to one or more embodiments of the present disclosure, the interactive method for the meeting minute according to the present disclosure further includes:
  determining the associated time period of the meeting minute and the associated subtitle of the meeting minute, based on the correspondence.

According to one or more embodiments of the present disclosure, in the interactive method for the meeting minute according to the present disclosure, the playing the meeting audio and video based on an associated time period of the meeting minute, and distinctively displaying an associated subtitle of the meeting minute in the meeting subtitle includes:
  playing the meeting audio and video at a starting time instant in the associated time period of the meeting minute, and stopping the meeting audio and video at an ending time instant in the associated time period of the meeting minute; and
  jumping the meeting subtitle to a location of the associated subtitle of the meeting minute, and distinctively displaying the associated subtitle of the meeting minute in a predetermined way.

According to one or more embodiments of the present disclosure, in the interactive method for the meeting minute according to the present disclosure, the predetermined way includes at least one of highlighting, bold font and adding an underline.

According to one or more embodiments of the present disclosure, the interactive method for the meeting minute according to the present disclosure further includes:
  associating the meeting minute in the meeting minute display interface, and displaying an associated time point corresponding to the meeting minute.

According to one or more embodiments of the present disclosure, in the interactive method for the meeting minute according to the present disclosure, the associated time point is a starting time instant in the associated time period of the meeting minute.

According to one or more embodiments of the present disclosure, the interactive method for the meeting minute according to the present disclosure further includes:
  receiving a first deletion triggering operation of the user, and deleting a first to-be-deleted meeting minute and an associated time point of the first to-be-deleted meeting minute.

According to one or more embodiments of the present disclosure, the interactive method for the meeting minute according to the present disclosure further includes:
  receiving a second deletion triggering operation of the user, deleting a second to-be-deleted meeting minute, and adding a new meeting minute based on an associated time point of the second to-be-deleted meeting minute.

According to one or more embodiments of the present disclosure, the interactive method for the meeting minute according to the present disclosure further includes:
  receiving a modification triggering operation of the user for a to-be-modified meeting minute; and
  modifying the to-be-modified meeting minute and/or an associated time point of the to-be-modified meeting minute.

According to one or more embodiments of the present disclosure, the interactive method for the meeting minute according to the present disclosure further includes:
  receiving a minute addition triggering operation of the user for a target subtitle in the meeting subtitle;
  displaying a minute addition interface, where the minute addition interface includes at least one minute addition component, and one minute addition component corresponds to one type of meeting minute; and
  receiving a triggering operation of the user for the minute addition component, and adding the target subtitle as a target meeting minute of a type corresponding to the minute addition component.

According to one or more embodiments of the present disclosure, the interactive method for the meeting minute according to the present disclosure further includes:

determining a starting time instant in an association time period of the target subtitle as a target association time point of the target meeting minute, and associating and displaying the target association time point and the target meeting minute.

According to one or more embodiments of the present disclosure, the interactive method for i the meeting minute according to the present disclosure further includes:

receiving a meeting minute display operation of an authorized user, where the authorized user is a user having an editing permission; and displaying a to-be-released meeting minute set for the meeting audio and video, based on historical meeting minute display data of the authorized user.

According to one or more embodiments of the present disclosure, in the interactive method for the meeting minute according to the present disclosure, one authorized user corresponds to one to-be-released meeting minute set, and the to-be-released meeting minute set includes at least one to-be-released meeting minute.

According to one or more embodiments of the present disclosure, the interactive method for the meeting minute according to the present disclosure further includes:

receiving a release triggering operation for a target to-be-released meeting minute by a target authorized user; and releasing the target to-be-released meeting minute, to cause other authorized users and a non-authorized user to browse a released meeting minute, where the non-authorized user has no editing permission.

According to one or more embodiments of the present disclosure, the interactive method for the meeting minute according to the present disclosure further includes:

receiving a search triggering operation of the user for a search keyword; and distinctively displaying a target keyword hit by searching for the search keyword in the meeting subtitle and the meeting minute.

According to one or more embodiments of the present disclosure, the interactive method for the meeting minute according to the present disclosure further includes:

displaying a search hit prompt identifier at a location corresponding to a time point of the target keyword on a playback timeline of the meeting audio and video.

According to one or more embodiments of the present disclosure, the interactive method for the meeting minute according to the present disclosure further includes:

receiving a translation triggering operation of the user for the meeting subtitle and/or the meeting minute; and translating the meeting subtitle and the meeting minute from an initial language to a target language.

According to one or more embodiments of the present disclosure, in the interactive method for the meeting minute according to the present disclosure, the meeting minute and the meeting video in the meeting audio and video are displayed in a same display window, and the meeting video is displayed in a top area of the display window.

According to one or more embodiments of the present disclosure, the interactive method for the meeting minute according to the present disclosure further includes:

receiving a scrolling operation of the user for the display window; and displaying, in a scrolling manner, the meeting video and the meeting minute in the display window.

According to one or more embodiments of the present disclosure, the interactive method for the meeting minute according to the present disclosure further includes:

displaying, in a scrolling process of the display window, a small video window of the meeting video in the meeting minute display interface, in a case that the meeting video is moved out of the display window.

According to one or more embodiments of the present disclosure, in the interactive method for the meeting minute according to the present disclosure, the small video window and the display window are not covered with each other.

According to one or more embodiments of the present disclosure, the interactive method for the meeting minute according to the present disclosure further includes:

receiving a triggering operation of the user for an operable control in the small video window, and performing a target operation corresponding to the operable control on the small video window.

According to one or more embodiments of the present disclosure, in the interactive method for the meeting minute according to the present disclosure, the operable control includes at least one of an exit control, a pause control and a close control; and the target operation corresponding to the operable control includes at least one of an exit and jump operation, a pause playback operation and a close operation.

According to one or more embodiments of the present disclosure, in the interactive method for the meeting minute according to the present disclosure, the meeting minute include at least one type of a topic, an agenda, discussion, conclusion and a to-do task.

According to one or more embodiments of the present disclosure, an interactive device for a meeting minute is provided according to the present disclosure. The device includes a meeting minute triggering module and an association interaction module.

The meeting minute triggering module is configured to receive an interactive triggering operation of a user for the meeting minute in a meeting minute display interface. The meeting minute display interface displays meeting audio and video, a meeting subtitle of the meeting audio and video and the meeting minute.

The association interaction module is configured to play the meeting audio and video based on an associated time period of the meeting minute, and distinctively display an associated subtitle of the meeting minute in the meeting subtitle.

According to one or more embodiments of the present disclosure, the interactive device for the meeting minute according to the present disclosure further includes: a meeting minute generation module.

The meeting minute generation module is configured to perform a speech recognition on the meeting audio and video, to determine the meeting subtitle of the meeting audio and video; and perform a text processing on the meeting subtitle to generate the meeting minute.

According to one or more embodiments of the present disclosure, the interactive device for the meeting minute according to the present disclosure further includes a correspondence module.

The correspondence module is configured to establish a correspondence among the meeting minute, the associated subtitle in the meeting subtitle and the associated time period of the associated subtitle in the meeting audio and video, where the meeting minute is generated based on the associated subtitle, and the associated time period is used to characterize a time period of speech information corresponding to the associated subtitle in the meeting audio and video.

According to one or more embodiments of the present disclosure, the interactive device for the meeting minute according to the present disclosure further includes an association information determination module.

The association information determination module is configured to determine the associated time period of the meeting minute and the associated subtitle of the meeting minute, based on the correspondence.

According to one or more embodiments of the present disclosure, in the interactive device for the meeting minute according to the present disclosure, the association interaction module is further configured to: play the meeting audio and video at a starting time instant in the associated time period of the meeting minute, and stop the meeting audio and video at an ending time instant in the associated time period of the meeting minute; and jump the meeting subtitle to a location of the associated subtitle of the meeting minute, and distinctively display the associated subtitle of the meeting minute in a predetermined way.

According to one or more embodiments of the present disclosure, in the interactive device for the meeting minute according to the present disclosure, the predetermined way includes at least one of highlighting, bold font and adding an underline.

According to one or more embodiments of the present disclosure, the interactive device for the meeting minute according to the present disclosure further includes an association time point module.

The association time point module is configured to associate the meeting minute in the meeting minute display interface, and display an associated time point corresponding to the meeting minute.

According to one or more embodiments of the present disclosure, in the interactive device for the meeting minute according to the present disclosure, the associated time point is a starting time instant in the associated time period of the meeting minute.

According to one or more embodiments of the present disclosure, the interactive device for the meeting minute according to the present disclosure further includes a first deletion module.

The first deletion module is configured to receive a first deletion triggering operation of the user, and delete a first to-be-deleted meeting minute and an associated time point of the first to-be-deleted meeting minute.

According to one or more embodiments of the present disclosure, the interactive device for the meeting minute according to the present disclosure further includes a second deletion module.

The second deletion module is configured to receive a second deletion triggering operation of the user, delete a second to-be-deleted meeting minute, and add a new meeting minute based on an associated time point of the second to-be-deleted meeting minute.

According to one or more embodiments of the present disclosure, the interactive device for the meeting minute according to the present disclosure further includes a modification module.

The modification module is configured to receive a modification triggering operation of the user for a to-be-modified meeting minute; and modify the to-be-modified meeting minute and/or an associated time point of the to-be-modified meeting minute.

According to one or more embodiments of the present disclosure, the interactive device for the meeting minute according to the present disclosure further includes an adding module.

The adding module is configured to receive a minute addition triggering operation of the user for a target subtitle in the meeting subtitle; display a minute addition interface, where the minute addition interface includes at least one minute addition component, and one minute addition component corresponds to one type of meeting minute; and receive a triggering operation of the user for the minute addition component, and add the target subtitle as target meeting minute of a type corresponding to the minute addition component.

According to one or more embodiments of the present disclosure, in the interactive device for the meeting minute according to the present disclosure, the adding module is further configured to: determine a starting time instant in an association time period of the target subtitle as a target association time point of the target meeting minute, and associate and display the target association time point and the target meeting minute.

According to one or more embodiments of the present disclosure, the interactive device for the meeting minute according to the present disclosure further includes a meeting minute push module.

The meeting minute push module is configured to receive a meeting minute display operation of an authorized user, where the authorized user is a user having an editing permission; and display a to-be-released meeting minute set for the meeting audio and video, based on historical meeting minute display data of the authorized user.

According to one or more embodiments of the present disclosure, in the interactive device for the meeting minute according to the present disclosure, one authorized user corresponds to one to-be-released meeting minute set, and the to-be-released meeting minute set includes at least one to-be-released meeting minute.

According to one or more embodiments of the present disclosure, the interactive device for the meeting minute according to the present disclosure further includes a release module.

The release module is configured to receive a release triggering operation for a target to-be-released meeting minute from a target authorized user; and release the target to-be-released meeting minute, to cause other authorized users and a non-authorized user to browse a released meeting minute, where the non-authorized user has no editing permission.

According to one or more embodiments of the present disclosure, the interactive device for the meeting minute according to the present disclosure further includes a search module.

The search module is configured to receive a search triggering operation of the user for a search keyword; and distinctively display a target keyword hit by searching for the search keyword in the meeting subtitle and the meeting minute.

According to one or more embodiments of the present disclosure, in the interactive device for the meeting minute according to the present disclosure, the search module is further configured to display a search hit prompt identifier at a location corresponding to a time point of the target keyword on a playback timeline of the meeting audio and video.

According to one or more embodiments of the present disclosure, the interactive device for the meeting minute according to the present disclosure further includes a translation module.

The translation module is configured to receive a translation triggering operation of the user for the meeting subtitle and/or the meeting minute; and translate the meeting subtitle and the meeting minute from an initial language to a target language.

According to one or more embodiments of the present disclosure, in the interactive device for the meeting minute according to the present disclosure, the meeting minute and the meeting video in the meeting audio and video are displayed in a same display window, and the meeting video is displayed in a top area of the display window.

According to one or more embodiments of the present disclosure, the interactive device for the meeting minute according to the present disclosure further includes a scrolling displaying module.

The scrolling displaying module is configured to receive a scrolling operation of the user for the display window; and display, in a scrolling manner, the meeting video and the meeting minute in the display window.

According to one or more embodiments of the present disclosure, the interactive device for the meeting minute according to the present disclosure further includes a small video window module.

The small video window module is configured to display, in a scrolling process of the display window, a small video window of the meeting video in the meeting minute display interface, in a case that the meeting video is moved out of the display window.

According to one or more embodiments of the present disclosure, in the interactive device for the meeting minute according to the present disclosure, the small video window and the display window are not covered with each other.

According to one or more embodiments of the present disclosure, in the interactive device for the meeting minute according to the present disclosure, the small video window module is further configured to: receive a triggering operation of the user for an operable control in the small video window, and perform a target operation corresponding to the operable control on the small video window.

According to one or more embodiments of the present disclosure, in the interactive device for the meeting minute according to the present disclosure, the operable control includes at least one of an exit control, a pause control and a close control. The target operation corresponding to the operable control includes at least one of an exit and jump operation, a pause playback operation and a close operation.

According to one or more embodiments of the present disclosure, in the interactive device for a meeting minute according to the present disclosure, the meeting minute include at least one type of a topic, an agenda, discussion, conclusion and a to-do task.

According to one or more embodiments of the present disclosure, an electronic apparatus is provided according to the present disclosure. The electronic apparatus includes: a processor and a memory.

The memory is configured to store executable instructions of the processor. The processor is configured to read the executable instructions from the memory and execute instructions to perform any one of the interactive method for the meeting minute according to any one of the embodiments of the present disclosure.

According to one or more embodiments of the present disclosure, a computer-readable storage medium is provided according to the present disclosure. The storage medium stores a computer program. The computer program is configured to perform the interactive method for the meeting minute according to any one of the embodiments of the present disclosure.

The above description includes merely preferred embodiments of the present disclosure and explanations of technical principles used. Those skilled in the art should understand that the scope of the present disclosure is not limited to technical solutions formed by a specific combination of the above technical features, but covers other technical solutions formed by any combination of the above technical features or equivalent features thereof without departing from an inventive concept of the present disclosure. For example, a technical solution formed by replacing the above features with the technical features (but not limited to) with similar functions disclosed in the present disclosure.

In addition, although the operations are described in a specific order, this should not be understood as requiring these operations to be performed in the specific order shown or in a sequential order. Under certain circumstances, multitasking and processing in parallel may be advantageous. In addition, although several specific implementation details are included in the above discussion, these should not be interpreted as limiting the scope of the present disclosure. Some features described in the context of individual embodiments may further be implemented in combination in one embodiment. In addition, various features described in the context of a single embodiment may be implemented in multiple embodiments individually or in any suitable subcombination.

Although the subject matter is described in language specific to structural features and/or logical actions of methods, it should be understood that the subject matter defined in the claims is not limited to the specific features or actions described above. In addition, the specific features and actions described above are merely examples for implementing the claims.

The invention claimed is:

1. An interactive method for a meeting minute, comprising:
   receiving an interactive triggering operation for the meeting minute in a meeting minute display interface, wherein the meeting minute display interface displays multimedia content, a meeting subtitle of the multimedia content, and the meeting minute, wherein the multimedia content comprises at least one of meeting audio and meeting video;
   in response to the interactive triggering operation for the meeting minute, playing the multimedia content on the meeting minute display interface based on an associated time period of the meeting minute, wherein the associated time period of the meeting minute is configured to characterize a time period of a meeting speech corresponding to the associated subtitle of the meeting minute in the multimedia content; and
   distinctively displaying an associated subtitle of the meeting minute in the meeting subtitle,
   wherein the associated time period comprises a starting time instant and an ending time instant of the meeting minute, and the distinctively displaying an associated subtitle of the meeting minute in the meeting subtitle, in response to the interactive triggering operation for the meeting minute comprises:
   displaying the associated subtitle between the starting time instant and the ending time instant of the meeting minute to distinguish the associated subtitle of the meeting minute from other meeting minute of the multimedia content, in response to the interactive triggering operation for the meeting minute, and wherein the method further comprises:

receiving a deletion triggering operation, deleting a to-be-deleted meeting minute, and adding a new meeting minute based on an associated time point of the to-be-deleted meeting minute.

2. The method according to claim 1, further comprising:
performing speech recognition on the multimedia content to determine the meeting subtitle of the multimedia content; and
performing text processing on the meeting subtitle to generate the meeting minute.

3. The method according to claim 1, further comprising:
establishing a correspondence among the meeting minute, the associated subtitle in the meeting subtitle, and the associated time period of the associated subtitle in the multimedia content, wherein the meeting minute is generated based on the associated subtitle, and the associated time period is used to characterize a time period of speech information corresponding to the associated subtitle in the multimedia content; and
determining the associated time period of the meeting minute and the associated subtitle of the meeting minute, based on the correspondence.

4. The method according to claim 1, wherein playing the multimedia content based on an associated time period of the meeting minute, and distinctively displaying an associated subtitle of the meeting minute in the meeting subtitle comprises:
playing the multimedia at the starting time instant in the associated time period of the meeting minute, and stopping the multimedia at the ending time instant in the associated time period of the meeting minute; and
jumping the meeting subtitle to a location of the associated subtitle of the meeting minute, and distinctively displaying the associated subtitle of the meeting minute in a predetermined way.

5. The method according to claim 4, wherein distinctively displaying the associated subtitle of the meeting minute in the predetermined way comprises displaying the associated subtitle of the meeting minute with at least one of highlighting, bold font, and an underline.

6. The method according to claim 1, further comprising:
associating the meeting minute in the meeting minute display interface, and displaying an associated time point corresponding to the meeting minute.

7. The method according to claim 6, wherein the associated time point is the starting time instant in the associated time period of the meeting minute.

8. The method according to claim 6, further comprising:
receiving a first deletion triggering operation, and deleting a first to-be-deleted meeting minute and an associated time point of the first to-be-deleted meeting minute.

9. The method according to claim 6, further comprising:
receiving a modification triggering operation for a to-be-modified meeting minute; and
modifying the to-be-modified meeting minute and/or an associated time point of the to-be-modified meeting minute.

10. The method according to claim 1, further comprising:
receiving a minute addition triggering operation for a target subtitle in the meeting subtitle;
displaying a minute addition interface, wherein the minute addition interface comprises at least one minute addition component corresponding to one type of meeting minute; and
receiving a triggering operation for the minute addition component, and adding the target subtitle as a target meeting minute of a type corresponding to the minute addition component.

11. The method according to claim 10, further comprising:
determining the starting time instant in an association time period of the target subtitle as a target association time point of the target meeting minute, and associating and displaying the target association time point and the target meeting minute.

12. The method according to claim 1, further comprising:
receiving a meeting minute display operation associated with an authorized user, wherein the authorized user is a user having an editing permission; and
displaying a to-be-released meeting minute set for the multimedia content, based on historical meeting minute display data of the authorized user.

13. The method according to claim 12, wherein one authorized user corresponds to one to-be-released meeting minute set, and the to-be-released meeting minute set comprises at least one to-be-released meeting minute.

14. The method according to claim 12, further comprising:
receiving a release triggering operation associated with a target authorized user for a target to-be-released meeting minute; and
releasing the target to-be-released meeting minute, to cause other authorized users and a non-authorized user to browse the released meeting minute, wherein the non-authorized user has no editing permission for the released meeting minute.

15. The method according to claim 1, further comprising:
receiving a search triggering operation for a search keyword;
distinctively displaying a target keyword hit by searching for the search keyword in the meeting subtitle and the meeting minute; and
displaying a search hit prompt identifier at a location corresponding to a time point of the target keyword on a playback timeline of the multimedia content.

16. The method according to claim 1, further comprising:
receiving a translation triggering operation for at least one of the meeting subtitle and the meeting minute; and
translating the at least one of the meeting subtitle and the meeting minute from an initial language to a target language.

17. The method according to claim 1, wherein the multimedia content comprises a meeting video, and the meeting minute and the meeting video in the multimedia content are displayed in a same display window, and the meeting video is displayed in a top area of the display window.

18. The method according to claim 17, further comprising:
receiving a scrolling operation for the display window;
displaying, in a scrolling manner, the meeting video and the meeting minute in the display window; and
in a scrolling process of the display window, displaying a small video window of the meeting video in the meeting minute display interface, in a case that the meeting video is moved out of the display window.

19. The method according to claim 18, wherein the small video window and the display window are not covered with each other.

20. The method according to claim 18, further comprising:
receiving a triggering operation for an operable control in the small video window, and performing a target operation corresponding to the operable control on the small video window.

21. The method according to claim 20, wherein,
the operable control comprises at least one of an exit control, a pause control, and a close control; and
the target operation corresponding to the operable control comprises at least one of an exit and jump operation, a pause playback operation, and a close operation.

22. The method according to claim 1, wherein the meeting minute comprises at least one type of a topic, an agenda, discussion, conclusion, and a to-do task.

23. A method for displaying a meeting minute, comprising:
displaying a first area and a second area on an information display interface;
displaying the meeting minute in the first area and displaying a meeting subtitle in the second area;
associating the meeting minute in the meeting minute display interface, and displaying an associated time point corresponding to the meeting minute; and
displaying a third area different from the first area and the second area on the information display interface, wherein the third area is configured to present meeting multimedia content corresponding to the associated time period of the meeting subtitle, wherein the meeting multimedia content comprises at least one of meeting audio and meeting video,
wherein the associated time period comprises a starting time instant and an ending time instant of the meeting minute, and the displaying a meeting subtitle in the second area comprises:
displaying the associated subtitle between the starting time instant and the ending time instant of the meeting minute to distinguish the associated subtitle of the meeting minute from other meeting minute of the multimedia content, in response to an interactive triggering operation for the meeting minute, and
wherein the method further comprises:
receiving a deletion triggering operation, deleting a to-be-deleted meeting minute, and adding a new meeting minute based on an associated time point of the to-be-deleted meeting minute.

24. The method according to claim 23, further comprising at least one of:
associating and displaying the meeting minute and an associated time point of the meeting minute in the first area; and
displaying a minute addition interface in response to a triggering operation for a target subtitle in the meeting subtitle displayed in the second area, wherein the minute addition interface comprises at least one minute addition component, and one minute addition component corresponds to one type of meeting minute.

25. The method according to claim 24, further comprising:
displaying a display box comprising an operable button, in response to the triggering operation for the target subtitle in the meeting subtitle displayed in the second area, wherein the display box comprises a minute button; and
displaying the minute addition interface, in response to a triggering operation for the minute button.

26. The method according to claim 24, further comprising:
adding the target subtitle as a target meeting minute of a type corresponding to the minute addition component, in response to a triggering operation for the minute addition component;
displaying the target meeting minute in the first area; and
determining a target association time point of the target meeting minute based on an association time period of the target subtitle, and associating and displaying the target association time point with the target meeting minute in the first area.

27. The method according to claim 23, wherein the meeting multimedia content comprises a meeting video, and the method further comprises:
displaying a small video window on the information display interface to continue playing the meeting video through the small video window, in response to the meeting video moved out of the first area due to a scrolling operation.

28. An electronic apparatus, comprising:
a processor; and
a memory, wherein the memory is configured to store executable instructions of the processor; and
the processor is configured to read the executable instructions from the memory and execute instructions to:
receive an interactive triggering operation for a meeting minute in a meeting minute display interface, wherein the meeting minute display interface displays multimedia content, a meeting subtitle of the multimedia content, and the meeting minute, wherein the multimedia content comprises at least one of meeting audio and meeting video; and
in response to the interactive triggering operation for the meeting minute, play the multimedia content on the meeting minute display interface based on an associated time period of the meeting minute, wherein the associated time period of the meeting minute is used to characterize a time period of a meeting speech corresponding to the associated subtitle of the meeting minute in the multimedia content; and
distinctively display an associated subtitle of the meeting minute in the meeting subtitle of the multimedia content; or
the processor is configured to read the executable instructions from the memory and execute instructions to:
display a first area and a second area on an information display interface;
display the meeting minute in the first area and display a meeting subtitle in the second area;
associate the meeting minute in the information display interface, and display an associated time point corresponding to the meeting minute; and
display a third area different from the first area and the second area on the information display interface, wherein the third area is configured to present meeting multimedia content corresponding to the associated time period of the meeting subtitle, wherein the meeting multimedia content comprises at least one of meeting audio and meeting video,
wherein the associated time period comprises a starting time instant and an ending time instant of the meeting minute, and the processor is further configured to read the executable instructions from the memory and execute instructions to:

display the associated subtitle between the starting time instant and the ending time instant of the meeting minute to distinguish the associated subtitle of the meeting minute from other meeting minute of the multimedia content, in response to an interactive triggering operation for the meeting minute, and wherein the method further comprises:

receiving a deletion triggering operation, deleting a to-be-deleted meeting minute, and adding a new meeting minute based on an associated time point of the to-be-deleted meeting minute.

29. A non-transitory computer-readable storage medium storing a computer program, wherein the computer program, when executed by a processor, causes the processor to:

receive an interactive triggering operation for a meeting minute in a meeting minute display interface, wherein the meeting minute display interface displays multimedia content, a meeting subtitle of the multimedia content, and the meeting minute, wherein the multimedia content comprises at least one of meeting audio and meeting video; and in response to the interactive triggering operation for the meeting minute, play the multimedia content on the meeting minute display interface based on an associated time period of the meeting minute, wherein the associated time period of the meeting minute is configured to characterize a time period of a meeting speech corresponding to the associated subtitle of the meeting minute in the multimedia content; and distinctively display an associated subtitle of the meeting minute in the meeting subtitle; or wherein the computer program, when executed by a processor, causes the processor to:

display a first area and a second area on an information display interface;

display a meeting minute in the first area and display a meeting subtitle in the second area;

associate the meeting minute in the information display interface, and display an associated time point corresponding to the meeting minute; and display a third area different from the first area and the second area on the information display interface, wherein the third area is configured to present meeting multimedia content corresponding to the associated time period of the meeting subtitle, wherein the meeting multimedia content comprises at least one of meeting audio and meeting video, wherein the associated time period comprises a starting time instant and an ending time instant of the meeting minute, and the computer program, when executed by a processor, causes the processor to:

display the associated subtitle between the starting time instant and the ending time instant of the meeting minute to distinguish the associated subtitle of the meeting minute from other meeting minute of the multimedia content, in response to an interactive triggering operation for the meeting minute, and wherein the method further comprises:

receiving a deletion triggering operation, deleting a to-be-deleted meeting minute, and adding a new meeting minute based on an associated time point of the to-be-deleted meeting minute.

* * * * *